March 25, 1958 R. V. EDDS 2,827,725
APPARATUS FOR DETERMINING DEPTH OF ETCHING
Filed March 7, 1955 2 Sheets-Sheet 1
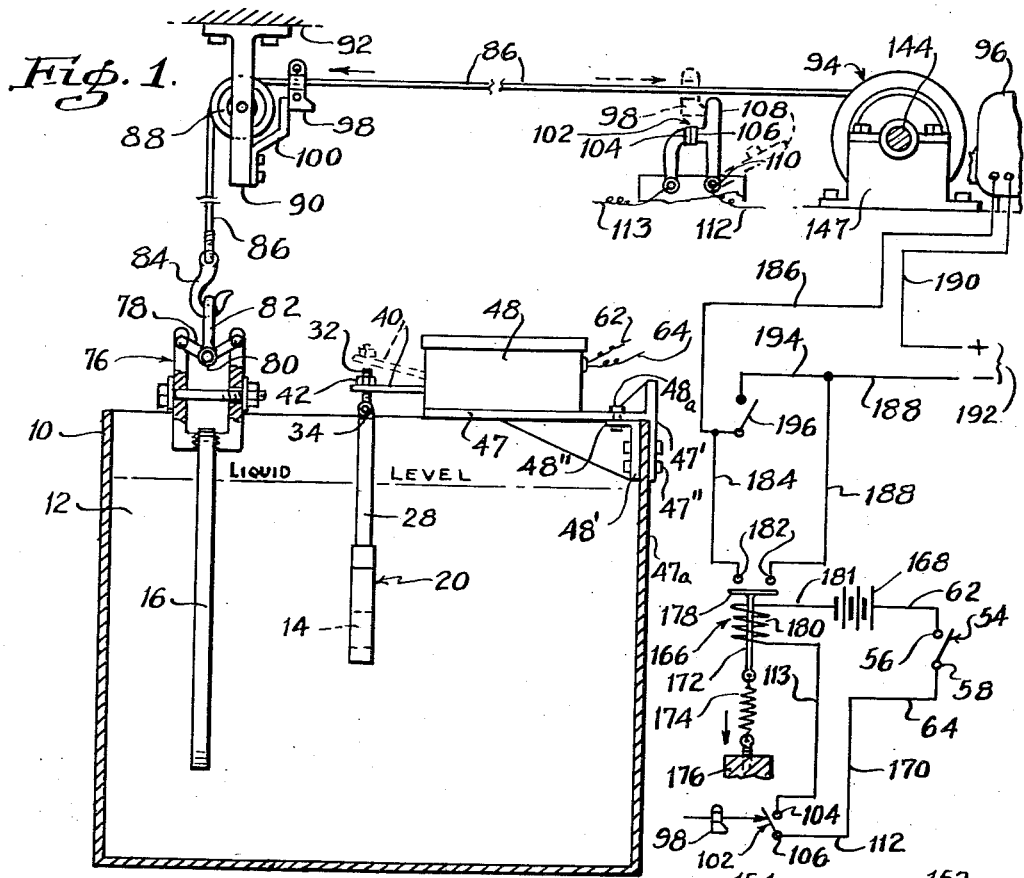
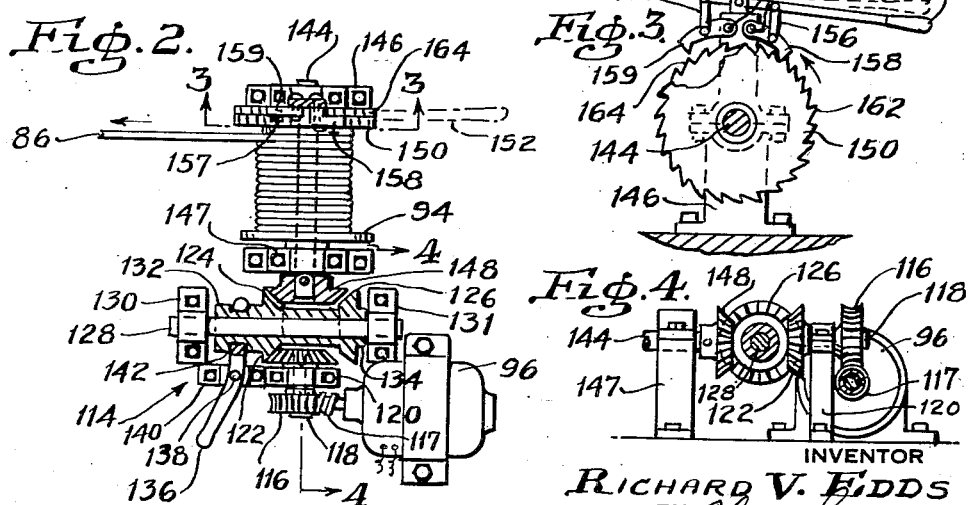
INVENTOR
RICHARD V. EDDS
BY
ATTORNEY.

March 25, 1958 R. V. EDDS 2,827,725
APPARATUS FOR DETERMINING DEPTH OF ETCHING
Filed March 7, 1955 2 Sheets-Sheet 2
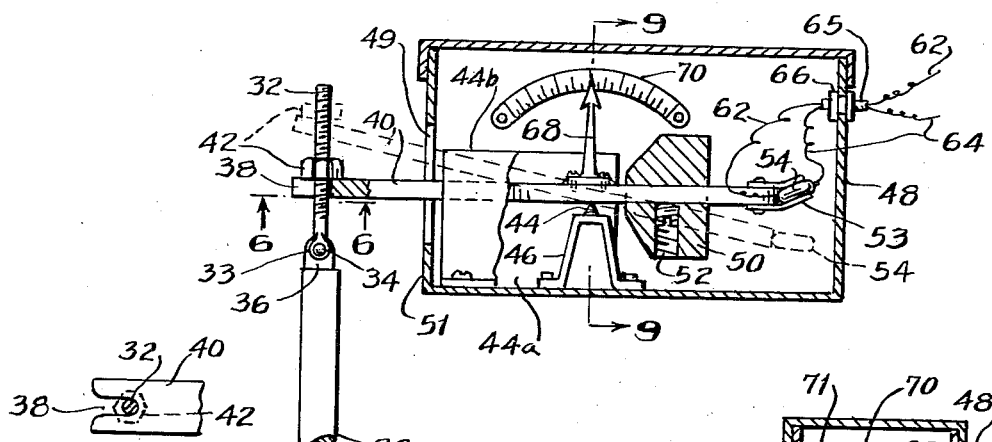
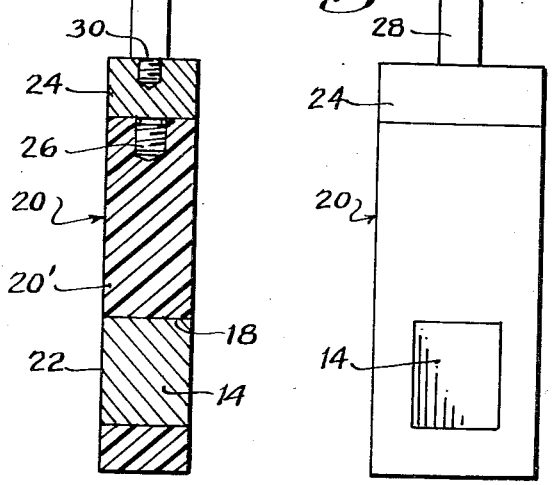
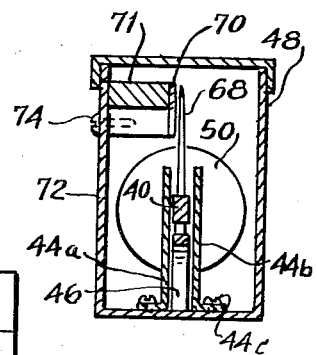
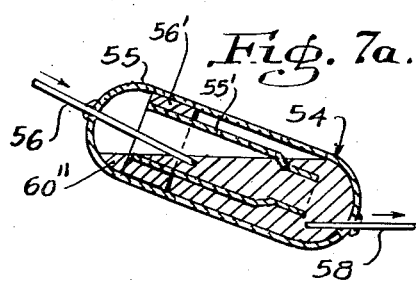
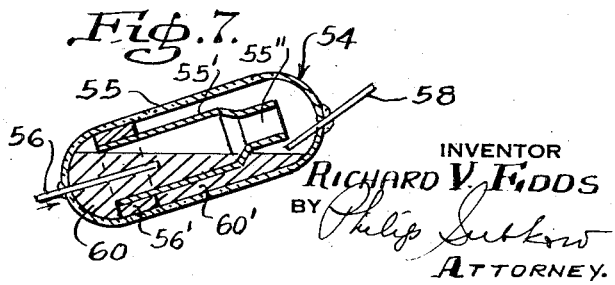
INVENTOR
RICHARD V. EDDS
BY
ATTORNEY.

United States Patent Office 2,827,725
Patented Mar. 25, 1958

2,827,725
APPARATUS FOR DETERMINING DEPTH OF ETCHING

Richard V. Edds, Los Angeles, Calif., assignor to Turco Products, Inc., Los Angeles, Calif., a corporation of California Application March 7, 1955, Serial No. 492,725

4 Claims. (Cl. 41—9)

This invention relates to ascertaining or monitoring attainment of a predetermined depth of etch in a work piece undergoing chemical etching or milling. The invention is particularly concerned with a method and device for sensing and signalling that a desired amount of etching has taken place in an etched work piece, followed by withdrawal of the work piece from the etching solution.

According to conventional practice, the etching of various materials has been controlled either on a straight time basis or by periodically removing the part to physically measure the remaining thickness. These methods are disadvantageous in that the first method does not take into consideration changes in the etching rate which accompanying a relatively long-term etching process, and the second method is wasteful of time and accuracy due to the periodic removal of the work from the bath. When a number of parts are in a bath, the latter method easily causes confusion, especially since the bath characteristics may vary without recognition or knowledge thereof by the operator. These problems are of particular importance when close tolerances are required in the etched member.

One object of this invention is to provide a method and apparatus for determining or monitoring etching depth.

Another object is the provision of a method and apparatus for determining the amount that a work piece has been chemically milled.

A still further object of the invention is to provide a method and apparatus of monitoring the attainment of a predetermined etching depth.

Still another object of the invention is the provision of a method and apparatus for attaining a predetermined depth of chemical etch on a work piece, including electrical, mechanical, or electromechanical sensing associated with a sample piece subjected to the same etching action as the work piece, for indicating attainment of said predetermined depth.

A still further object is the provision of a method and apparatus as set forth above, and further providing for removal of the etched work piece from contact with the etching solution on attainment of a predetermined depth of etch on said work piece, and in response to said sensing of the action of the etching solution on said sample piece.

Yet another object is to provide a method and apparatus for obtaining a predetermined depth of metal removal from the surface of a metal work piece by chemical etching.

Other objects and advantages of the invention will appear hereinafter.

The instant invention is based on the principle that when an article subject to attack by an etching solution is treated therein, the amount of material dissolved from said article is proportional to the weight loss of the article during etching. Thus, according to the invention, the attainment of a desired or predetermined depth of material removal from such an article subjected to chemical etching in an etching solution can be indicated by exposing a predetermined area of said article to etching treatment, and etching the exposed area for a period sufficient to effect a preselected weight loss of the article corresponding to the desired predetermined depth of material removal. The attainment of said preselected weight loss is sensed or signalled to indicate that the desired depth of etch has been reached. In response to this signal, the article itself can be removed from the solution or some other action initiated which depends on or is related to the attainment of such predetermined depth of etch.

Thus, where it is desired to etch a work piece to a predetermined depth, and particularly where such work piece has an irregular surface, a sample of the same material as the work piece, and having a predetermined area exposed for etching, can be placed in an etching solution along with and adjacent to the work piece to be etched in said solution. The work piece and the sample are then etched under substantially the same conditions in the etching bath. When the weight loss of the sample piece has attained a preselected value, the work piece will then be etched to the desired predetermined depth. Such weight loss is sensed, and this serves as a signal to actuate a desired action on the work piece being processed, such as removal thereof from the etching solution. In the latter case, a mechanism is triggered for removing the work piece from the etching solution. Hence, the work piece is withdrawn from the etching solution practically immediately on attainment of the desired amount or depth of etching thereof.

More specifically, in one mode of carrying out the invention, a sample piece of the same metal as a work piece to be chemically etched, is supported at one end of a pivoted beam which is counterweighted. Preferably, I employ as the sample piece a metal having the same chemical composition and physical properties as the metal of which the work piece is composed. The work piece is independently supported for movement into and out of the etching solution by a cable operated by a motor. A predetermined area of the sample piece is exposed for etching, and the sample and work piece are placed in the etching solution in proximity to each other. The counterweight on the beam supporting the sample piece is so positioned therealong that when the weight loss of the metal etched from the sample and corresponding to the desired depth of etch has been obtained, which depth of etch will be the same for both the work piece and the sample piece, any additional material removal from or etching of the sample will lighten the sample sufficiently to cause said beam to pivot and the sample to rise in the etching solution to actuate a sensing device.

The sensing device can be a switch mounted at the other end of said beam from the sample. The switch operates to close a circuit to the motor, which in turn operates the cable from which the work piece is supported, lifting said work piece out of the etching solution. Since the switch and motor operate almost instantaneously to remove the work piece from the etching solution on pivotal motion of the beam which supports the sample, the work piece will be etched on all its exposed surfaces to a depth substantially equal to the predetermined depth of etch of the sample at the time of actuation of the beam.

The invention will be more readily understood from the following description of a preferred embodiment of the invention, taken in connection with the accompanying drawings, wherein:

Fig. 1 is a sectional view in elevation of my device, shown in operative position for etching a work piece to a predetermined depth, including a schematic representation of a circuit for operation of the motor to conduct the work piece into and out of the etching tank;

Fig. 2 is a plan view of the motor and pulley for operating the cable to which the work piece is attached;

Fig. 3 is a section taken on line 3—3 of Fig. 2;

Fig. 4 is a section taken on line 4—4 of Fig. 2;

Fig. 5 is a view in elevation of the mechanism for supporting the sample piece, and including the supporting beam therefor and the sensing means or switch associated with said beam;

Fig. 6 is a view taken on line 6—6 of Fig. 5, showing the manner of attachment to the end of said beam of the support for a sample piece holder;

Fig. 7 is a detail view of the sensing means or switch in its inoperative position;

Fig. 7a is a view similar to Fig. 7, showing the switch in an operative position;

Fig. 8 is an elevational view of the holder for the sample piece; and

Fig. 9 is a section taken on line 9—9 of Fig. 5.

Numeral 10 represents a tank containing an etching solution 12 which may be either of the acid or alkaline type depending on the particular metal or material being etched. Where aluminum or its alloys are to be etched, the etching treatment is carried out in an aqueous solution containing an alkali such as sodium or potassium hydroxide, trisodium phosphate, sodium carbonate or the like, or mixtures thereof. Concentration of the alkali etching solution can be in the range of 0.1 to 10 normal. Temperature of the solution may range say from room temperature, for example, 60° to 70° F., to about 212° F. Generally, a hot solution is employed, with temperature maintained in a range from about 140° F. to about 210° F. during treatment.

A sample piece of metal 14 (see Fig. 5) of the same material as a work piece 16, e. g., of aluminum, which is to be etched to a predetermined depth according to the invention, is inserted in a cavity or aperture 18 of a test block or holder 20. In this manner only the opposite surfaces 22 of the work piece are exposed for attack by the etching solution. The body of holder 20 is constructed of a material, e. g., rubber or plastic, which resists attack by the etching solution. The sample piece 16 is shown as having substantially square opposite surface areas 22, and the sample piece 16 is of substantially the same size, including thickness, as aperture 18, and fits snugly therein so that the sample piece will not be dislodged from such aperture during the etching treatment. It will be understood, of course, that sample pieces having a shape different from the sample piece 14 shown, e. g., circular, can be used, and the aperture 18 shaped accordingly to receive said sample piece. Further, if desired, means other than that illustrated may be utilized to support the sample piece in the solution so that only certain desired surface areas thereof are exposed to the action of the etching solution.

The holder 20 is attached along its upper surface to a plate 24 by means of studs 26 which enter the body of the holder, and the plate 24 is in turn connected to the lower end of a rod 28 by means of a stud 30 attached to said rod and passing into the body of plate 24. A screw 32 for supporting rod 28 has an eye 33 at its lower end, which receives pin 34 attached to a bracket 36 which is integral with the upper end of rod 28. The screw 32 is received in a notch 38 at the end of a beam 40, and the assembly including rod 28, holder 20, and the sample piece is supported from beam 40 by means of an adjustable nut 42 on screw 32 and in contact with the upper surface of beam 40.

The beam 40 is fulcrumed intermediate its ends on a knife edge 44 positioned on a support 46 contained in a housing 48, said support being bolted to the bottom of said housing, which is in turn mounted on a platform 47. Platform 47 (see Fig. 1) has an integral vertical bracket 47' at one end thereof, the bracket being connected by bolt and nut assemblies 47" to the upper portion of a wall 47a of the tank, said bolt and nut assemblies also fastening a second bracket 48' to the inner surface of tank wall 47a. Bracket 48' has a horizontal upper portion 48" which is connected to platform 47 by bolt and nut assemblies 48a. The beam 40 is positioned between vertical guide plates 44a and 44b (see Fig. 9) connected by bolts 44c to the bottom of housing 48, and passes through a vertical slot 49 in end wall 51 of housing 48, permitting pivotal movement of said beam in a vertical plane. A counterweight 50 is adjustably positioned along the beam 40 on the other side of the knife edge from the screw 32, by means of a set screw 52. The counterweight 50 can be adjusted along beam 40 to permit immersion of holder 20 containing the sample piece 14 in the solution, and during etching treatment to permit a preselected amount of clockwise rotation of the beam 40, viewed in Figs. 1 and 5, when a preselected quantity of metal is etched from surfaces 22 of the sample 14, as described more fully hereinafter.

A mercury switch 54 is connected by a support 53 to the end of beam 40 adjacent the counterweight 50, said switch having a non-conductive envelope 55 (see Figs. 7 and 7a) containing two electrodes 56 and 58 at opposite ends of the envelope and an internal insulating sleeve 55' supporting within the envelope by an insulating annular ring 56' between said sleeve and the envelope. Within the envelope is mercury which, when the envelope 55 is in the position shown in Fig. 7, is separated into two bodies of mercury 60 and 60' by the insulating ring 56'. Electrical leads 62 and 64 are connected to electrodes 56 and 58, and such leads, protected by insulation 65, are connected through a plug 66 in the wall of housing 48, in an electrical circuit described below.

It is seen that switch 54 is tilted upwardly at an angle to the axis of beam 40. Thus, when the beam is in a horizontal position as seen in Figs. 1 and 5, or when the beam is pivoted to lower the left end thereof supporting the holder 20 while raising the right end of the beam including switch 54, the switch will be in the inoperative open position shown in Fig. 7, with the two bodies of mercury 60 and 60' separated. But when the beam 40 is pivoted clockwise to raise the left end thereof and lower the right end including switch 54 a certain amount, the switch is in its operative closed position as illustrated in Fig. 7a, since the two bodies of mercury 60 and 60' are now joined to form a single continuous body of mercury 60" by passage of the body of mercury 60 through the open end 55" of sleeve 55', said single body of mercury 60" being in contact with both electrodes 56 and 58. A pointer 68 is connected to the beam 40 in vertical alignment with the knife edge 44, pointer 68 moving along a calibrated scale 70, to visually gage the extent of pivotal movement of the beam 40, said scale being connected to an arcuately shaped support 71 (see Fig. 9) in turn attached to a said wall 72 of the housing 48 by means of screws 74.

The work piece 16 is supported for movement into and out of the body of etching solution in tank 10 by a clamp 76 (see Fig. 1) making contact with the opposite sides of the work piece at the upper portions thereof, and frictionally gripping the work piece. The clamp 76 has a pair of articulating links 78 pivotally connected at their adjacent inner ends; and to their pivot pin 80 is attached a supporting ring 82 which is received by a hook 84 connected to the end of a cable 86. The cable passes over a pulley 88 supported on a bracket 90 bolted to the ceiling 92 or an overhanging structural member. The cable is wound and unwound from a pulley 94 (see also Fig. 2) operated by a motor 96; and cable 86 has attached thereto a stop 98 which moves between the pulleys 88 and 94.

Bracket 90 has an arm 100 connected thereto which makes contact with the stop 98 on the cable to prevent further unwinding of the cable from pulley 94 and further lowering of the work piece in the solution. A switch 102 is provided adjacent pulley 94, said switch comprising a fixed contact 104 and a movable contact 106 mounted on an arm 108 which is pivoted at 110 for clockwise movement to separate the contacts and open the switch. Such pivotal clockwise movement of switch arm 108 takes place on contact of the upper portion of arm 108 by stop 98 as the latter moves past the switch 102 toward pulley 94 when the cable is wound thereon. Switch 102 is connected in the circuit described below by leads 112 and 113. When the switch arm 108 is in the full line position shown in Fig. 1, there is provided sufficient friction at the pivot 110 to maintain the contacts 104 and 106 engaged.

Motor 96 operates pulley 94 through a speed reducing and reversing system 114. This system is composed of a gear 116 driven by a worm 117 on the motor drive shaft, said gear being mounted on a shaft 118 supported in a bearing 120. A bevel gear 122 is fixedly mounted at the other end of shaft 118 for rotation therewith, and meshes either with the bevel gear 124 or bevel gear 126, both of which are mounted for rotation on a shaft 128 positioned normal to shaft 118 and journalled at its opposite ends in bearings 130 and 131. Shaft 128 and the gears 124 and 126, mounted thereon, are axially movable, the shaft 128 having stop members 132 and 134 positioned thereon, adjacent gears 124 and 126, for abutment with the bearings 130 and 131 to limit said axial movement. A lever 136 is pivotally mounted on a pivot pin 138 connected to a bracket 140, the end of the lever being positioned in a notch 142 provided in the stop member 132.

Pulley 94 is mounted on a shaft 144 which is journalled at its opposite ends in bearings 146 and 147. The shaft 144 is in axial alignment with shaft 118, and shaft 144 has a bevel gear 148 mounted on its inner end and adapted to engage either bevel gear 124 or bevel gear 126. It is seen that when lever 136 is pivoted clockwise, it will displace shaft 128 and gears 124 and 126 to the right to bring bevel gear 124 into engagement with gears 122 and 148, as seen in Fig. 2; and, assuming clockwise rotation of gear 122 by the motor, gear 148 and pulley 94 will rotate counterclockwise to unwind the cable 86 from said pulley, as seen by the arrow in Fig. 2. When lever 136 is pivoted counterclockwise, this action will displace shaft 128 and gears 124 and 126 to the left, bringing bevel gear 126 into engagement with gears 122 and 148. This will reverse the direction of rotation of gear 148 and pulley 94, so that these members will now rotate clockwise to wind the cable 86 on said pulley.

A double ratchet wheel 150 (see Fig. 3) is mounted on shaft 144 adjacent bearing 146, and a lever 152 is pivotally connected at 154 to bearing member 146, said lever having attached thereto a pair of depending extensions 156 and 157 on opposite sides of the pivot pin 154. A pair of pawls 158 and 159 are each attached to the lower ends of extensions 156 and 157, respectively, and are each pivotally connected at 160, at one end, to bearing member 146. The free end of pawl 158 makes contact with the teeth 162 on one side of the ratchet wheel on clockwise rotation of lever 152, said teeth facing in a counterclockwise direction so that engagement of pawl 158 with said teeth prevents counterclockwise rotation of shaft 144 and pulley 94. The free end of pawl 159 makes contact with the teeth 164 on the other side of ratchet wheel 150 when lever 152 is pivoted counterclockwise, teeth 164 facing in a clockwise direction so that engagement of pawl 159 therewith prevents clockwise rotation of shaft 144 and pulley 94. It is seen that when pawl 158 is in contact with the ratchet wheel 150, pawl 159 is free from contact therewith, and vice versa. Also, both pawls can be lifted free of wheel 150.

Mercury switch 54 controls motor 96 through a circuit (see Fig. 1) including, in series, switch 102, a relay 166, and a battery 168. Switch 54 is connected to switch 102 through leads 64 and 112, connected together by lead 170, and switch 54 is connected to one side of the battery 168 by lead 62. The relay 166 comprises a switch arm 172 connected at one end to a spring 174 in turn connected to a stationary member 176, the other end of arm 172 having a cross contact 178 connected thereto. A coil 180 is disposed about arm 172, the coil being connected at one end to lead 112 and at the other end to a lead 181, in turn connected to the other side of battery 168.

When switches 54 and 102 are closed and the relay 166 is energized, switch arm 172 moves to bring contact 178 into engagement with terminals 182 to close a circuit to the motor, said circuit including, in addition to terminals 182, leads 184 and 186, the latter being connected to the motor, and leads 188 and 190, the latter also being connected to the motor. Leads 188 and 190 are connected to a source of electrical energy 192 for operation of the motor. A lead 194 is connected in parallel in this circuit across leads 184 and 188, a manual switch 196 being disposed between leads 184 and 194. It is thus seen that when relay 166 is open, the motor 96 can nevertheless be placed in operation by closing the manual switch 196. When switch 196 is open, the motor will only operate if both switches 54 and 102 are closed.

In employing the above-described novel apparatus for carrying out the invention procedure, it is first determined what the desired depth of etch is to be given the work piece 16. Since this same depth of etch will be imparted to the exposed surfaces 22 of the sample piece for a given etch period in the etching solution 12 (assuming other conditions of etching such as concentration and temperature of the solution in the proximity of both the work piece and sample are the same), knowing the area of the surfaces 22 of the sample to be exposed to the etching solution, the amount of metal which will be dissolved from the sample by etching during this period can be calculated. This portion of metal which will be eaten away from the sample by etching will result in a corresponding weight loss of the sample. From this weight loss, which can be calculated, the position of the counterweight 50 can be adjusted along the beam 40 so that when both the sample and work piece have been etched to the desired depth, the weight loss of the sample will cause the counterweight to overbalance the holder and sample therein, and rotate the beam 40 clockwise, lifting the holder and sample 14 in the solution until the beam has rotated sufficiently to actuate mercury switch 54.

The sample 14 is then fitted carefully into the aperture 18 of the holder 20, with the exposed surfaces 22 of sample 14 flush with the adjacent surfaces 20' of holder 20. The holder containing sample piece 14 is mounted on the beam 40 in the manner described above and shown in Fig. 5, i. e., by inserting screw 32 in the notch 38 at the end of the beam and adjusting the nut 42 to the proper position. The holder is then placed in the etching solution so that the exposed surfaces 22 of the sample are completely immersed, and the counterweight 50 is adjusted to the desired position along beam 40, as described above.

The work piece 16 held by the clamp 76 is placed in the solution practically simultaneously with the sample piece 14 and in proximity thereto, so that etching of both the work piece and sample commence at the same time and proceed at the same rate. The sample piece and work piece are now in position for etching as seen in Fig. 1, with the sample holder 20, beam 40, counterweight 50, and switch 54 in their respective positions as illustrated particularly in Figs. 1 and 5. The work piece is conducted into the solution by rotating the lever 152 counterclockwise to disengage pawl 158 from the teeth 162 of the ratchet wheel 150, shifting lever 136 to place gear 124 in engagement with gears 122 and 148, as shown in Fig. 7, for counterclockwise rotation of pulley 94 by the motor, and closing the manual switch 196 to energize the motor. When the proper amount of cable 86 has been unwound to immerse the work piece 16 to the desired depth in the etching solution, the switch 196 is opened to cut the motor, and lever 152 is actuated to place pawl 158 in contact with teeth 162 of the ratchet wheel to prevent further unwinding of the cable during the etching period.

Lever 136 is then pivoted counterclockwise to shift gear 126 into contact with gears 122 and 148, so that subsequent actuation of the motor will cause rotation of pulley 94 clockwise to wind cable 86 thereon. In the event too much cable is unwound during the process of placing the work piece in the etching bath 12, stop 98 will abut the arm 100 on bracket 90, preventing further unwinding of the cable. While work piece 16 is being conducted into the etching solution, and during the etching period, mercury switch 54 is open as seen in Fig. 7, so that the relay 166 remains unenergized. Also, while the work piece is being placed in the solution, or during the etching period, switch 102 is closed by pivoting arm 108 counterclockwise, so that the contacts 104 and 106 are touching.

When the work piece and sample piece 14 have been etched to the same desired depth, the loss of weight of the sample will cause the counterweight 50 to rotate the beam 40 clockwise, at the same time lifting the holder 20 and sample piece 14 in the solution. Any minor amount of additional etching or weight loss of the sample 14 will cause further rotation of the beam 40 to the dotted line position shown in Figs. 1 and 5. When the beam has been thus rotated to the aforementioned position, mercury switch 54 will be inclined in the position shown most clearly in Fig. 7a, thus closing the switch. Since switch 102 is also closed at this point, the relay 66 will be energized, bringing contact member 178 thereof into engagement with contacts 182 to close the circuit to the motor. Actuation of the motor then causes the pulley 94 to rotate clockwise, winding the cable 86 onto this pulley and rapidly lifting the work piece from the etching solution to prevent further attack thereof by the solution.

During this operation, when the stop 98 strikes switch arm 108 as the stop moves with the cable toward pulley 94 (see Fig. 1), arm 108 will be pivoted clockwise out of engagement with the fixed contact 104 to its dotted line position, opening the circuit to the motor and shutting it off. In the event it is desired to prevent further winding of the cable on pulley 94, and as an added safety measure, lever 152 can be actuated to place pawl 159 in contact with teeth 164 of the ratchet wheel, preventing further clockwise rotation of pulley 94. When the pulley 94 and cable 86 have come to rest, however, lever 152 is shifted to bring pawl 158 in contact with the ratchet wheel and disengage pawl 159 therefrom to prevent unwinding of the cable due to the weight of the clamp 76 and the work piece supported thereby. The etched work piece is then removed from said clamp.

The above-described operation can then be repeated, using a new work piece and sample.

It is noted that, through the use of the switch 54 and an electrical circuit, such as that shown and described above for actuation of the motor, there is a minimum time delay between the actuation of switch 54 and the operation of the motor, and the motor thus set into operation rapidly lifts the work piece from the solution. Accordingly, after actuation of switch 54 to signal attainment of the predetermined depth of etch on the work piece, the work piece is withdrawn from the solution before any practical amount of further etching can take place on the work piece.

It is to be understood, of course, that instead of employing the sensing device or switch 54 to actuate mechanism for lifting the work piece from the solution, actuation of this switch or an equivalent sensing device can be employed to initiate any other desired action with respect to the work piece when a predetermined depth of etch has been attained, e. g., the start of an additional etching period.

Further, it is to be understood that the sample piece 14 itself can be the work piece which it is desired to etch to a predetermined depth. Thus, when the weight loss of such work piece by etching thereof and corresponding to this predetermined depth of etch is obtained, mechanism can be provided which will be actuated by switch 54 or an equivalent sensing means to lift the work piece from the etching solution, or initiate any other action with respect to said work piece.

By proper adjustment of the sensitivity of the balance and of the response of the apparatus, the time lag of the functioning of the apparatus can be reduced so that the depth of etch in the work piece between the time when the beam is actuated and the time of withdrawal of the work piece, may be reduced to insubstantial proportions as will be understood in the art.

While I have described a particular embodiment of my invention for the purpose of illustration, it should be understood that various modifications and adaptations thereof may be made within the spirit of the invention as set forth in the appended claims.

I claim:

1. A device for obtaining a predetermined depth of material removal from a work piece by chemical etching in an etching solution, which comprises a tank for said solution, a first support for said work piece, a second support for a sample piece, a first means for moving said first support into and out of said tank, a second means for moving said second support into and out of said tank, a third means for actuating said second means when said sample has undergone a predetermined loss of weight due to etching thereof in said etching solution, and a fourth means responsive to said actuation by said third means for operating said first means.

2. A device for obtaining a predetermined depth of material removal from a work piece by chemical etching in an etching solution, which comprises a tank for said solution, a first support for said work piece, a second support for a sample piece, a first means for moving said first support into and out of said tank, a second means for moving said second support into and out of said tank, a third means for actuating said second means when said sample has undergone a predetermined loss of weight due to etching thereof in said etching solution, a sensing means responsive to said actuation by said third means, and a fifth means responsive to operation of said sensing means for operating said first means.

3. A device for obtaining a predetermined depth of material removal from a work piece by chemical etching in an etching solution, which comprises a tank for said solution, a first support for said work piece, a second support for a sample piece, a beam, said second support being connected to said beam, said beam being pivoted intermediate its ends, means causing rotation of said beam when said sample has undergone a predetermined loss of weight due to etching thereof in said etching solution, means for sensing an amount of beam rotation in response to said loss of weight, and means connected to said first support and responsive to actuation of said sensing means, for moving said first support with respect to said tank.

4. A device for obtaining a predetermined depth of material removal from a work piece by chemical etching in an etching solution, which comprises a tank for said solution, a first support for said work piece, a second support for a sample piece, said supports being adapted for movement into and out of said tank, a beam, said second support being connected to said beam near one end thereof, said beam being pivoted intermediate its ends, a counterweight on said beam, said counterweight causing rotation of said beam when said sample has undergone a predetermined loss of weight due to etching thereof in said etching solution, switch means for sensing an amount of beam rotation in response to said loss of weight, a motor, said motor being connected to said first support to control movement thereof with respect to said tank, an electrical circuit, said switch means and motor being connected in said circuit, and said circuit actuating said motor for movement of said first support out of said tank on actuation of said switch means.

References Cited in the file of this patent

UNITED STATES PATENTS

| | | |
|---|---|---|
| 148,459 | Homan | Mar. 10, 1874 |
| 2,067,290 | Robertson | Jan. 12, 1937 |
| 2,364,501 | Wolfskill | Dec. 5, 1944 |
| 2,416,716 | Ross | Mar. 4, 1947 |
| 2,762,036 | Triman | Sept. 4, 1956 |

FOREIGN PATENTS

| | | |
|---|---|---|
| 120,843 | Germany | May 24, 1901 |
| 631,756 | Great Britain | Nov. 9, 1949 |